May 24, 1949. L. HATHAWAY 2,470,982
WATER COOLING SYSTEM FOR INTERNAL-COMBUSTION
ENGINES AND THE LIKE
Filed Jan. 20, 1947 4 Sheets-Sheet 3
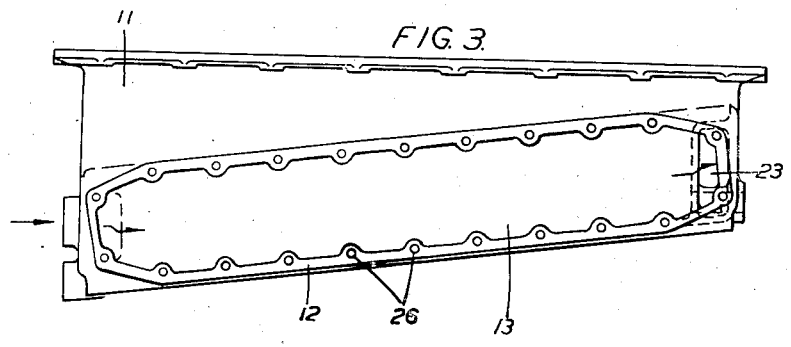
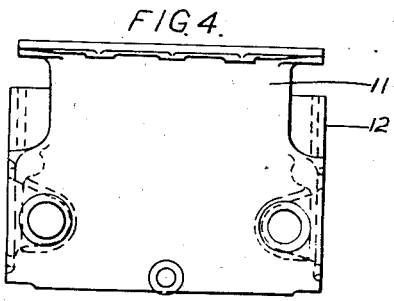
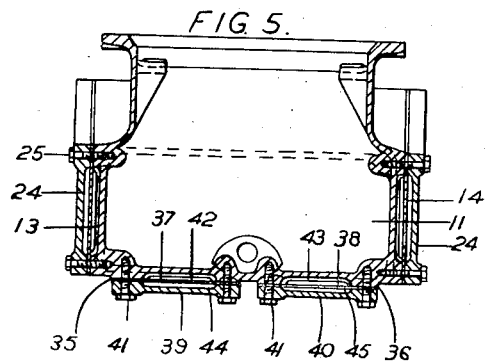
Inventor
LAWRENCE HATHAWAY
by
Robert B Larson
Attorney Inventor
LAWRENCE HATHAWAY
by
Robert B Larson
Attorney Patented May 24, 1949

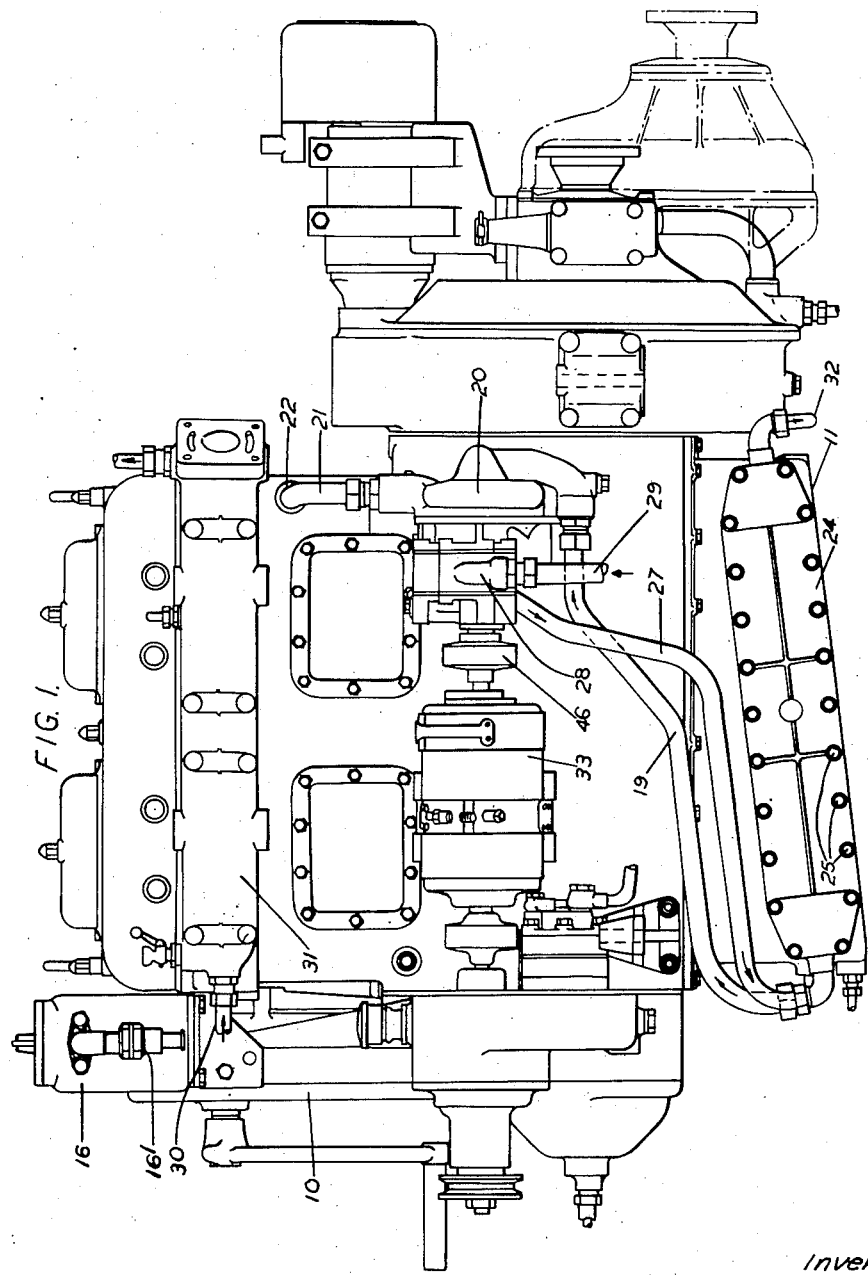

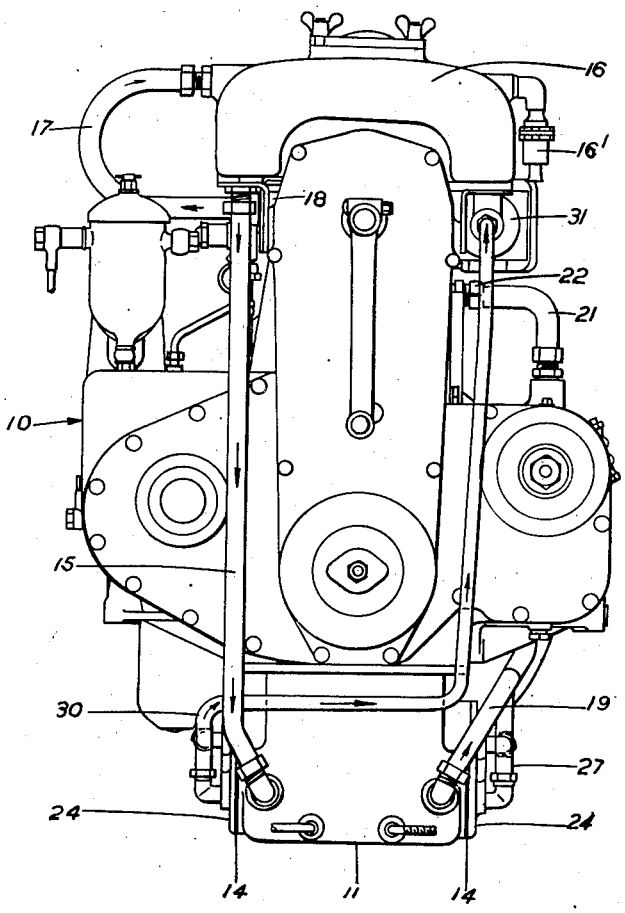

2,470,982

UNITED STATES PATENT OFFICE 2,470,982

WATER-COOLING SYSTEM FOR INTERNAL-COMBUSTION ENGINES AND THE LIKE

Lawrence Hathaway, Oswestry, England, assignor to Coventry Climax Engines Limited, Coventry, England, a British company Application January 20, 1947, Serial No. 722,998 In Great Britain January 21, 1946

7 Claims. (Cl. 123—170)

1

This invention relates to a water-cooling system for an internal combustion or like engine and is more particularly applicable to a compression ignition engine for marine use. The object of the invention is to provide an efficient water-cooling system for an engine which is designed for use in conditions where a radiator cannot be employed for cooling the water in the system.

According to the invention a water-cooling system, for an internal combustion or like engine, having a closed circuit through which water is circulated to cool the engine and which has a section cooled by liquid from an exterior source of supply, is provided with a pair of shallow chambers which are in intimate contact with one another, one chamber forms a section of the closed-circuit water-cooling system of the engine, the other chamber receives cooling liquid from an exterior source of supply, and one of the chambers is in intimate contact with a part of the engine. As stated one of the chambers provides a section of the closed-circuit system the remainder of which may be of conventional design, and the other chamber receives its cooling liquid from any convenient external source, for example, from the sea in the case of a marine engine, and the cooling liquid may be passed through the second chamber by means of a pump. The intimate contact between the two chambers may be provided by a thin wall or diaphragm which separates the two chambers for which it constitutes a common wall, and the diaphragm is preferably corrugated or otherwise formed to provide large surface areas to facilitate the rapid transference of heat between the liquids in the two chambers. More than one pair of shallow chambers may be provided, and in this event, the chambers may be arranged in parallel, or in series, in their respective systems. One of the chambers or one of each pair of chambers, has intimate contact with a part of the engine and in this case a wall of the chamber may be provided by a wall of the engine, such, for example, as the wall or base of the engine, oil sump and preferably such chamber would form part of the closed-circuit system.

In order that the invention may be clearly understood and readily carried into effect, the application of the water-cooling system to a marine engine will now be more fully described, by way of example, with reference to the accompanying drawings, in which:

Figure 1 is a side elevation of one side of the engine;

Figure 2 is a view looking at the front of the engine;

2

Figure 6:
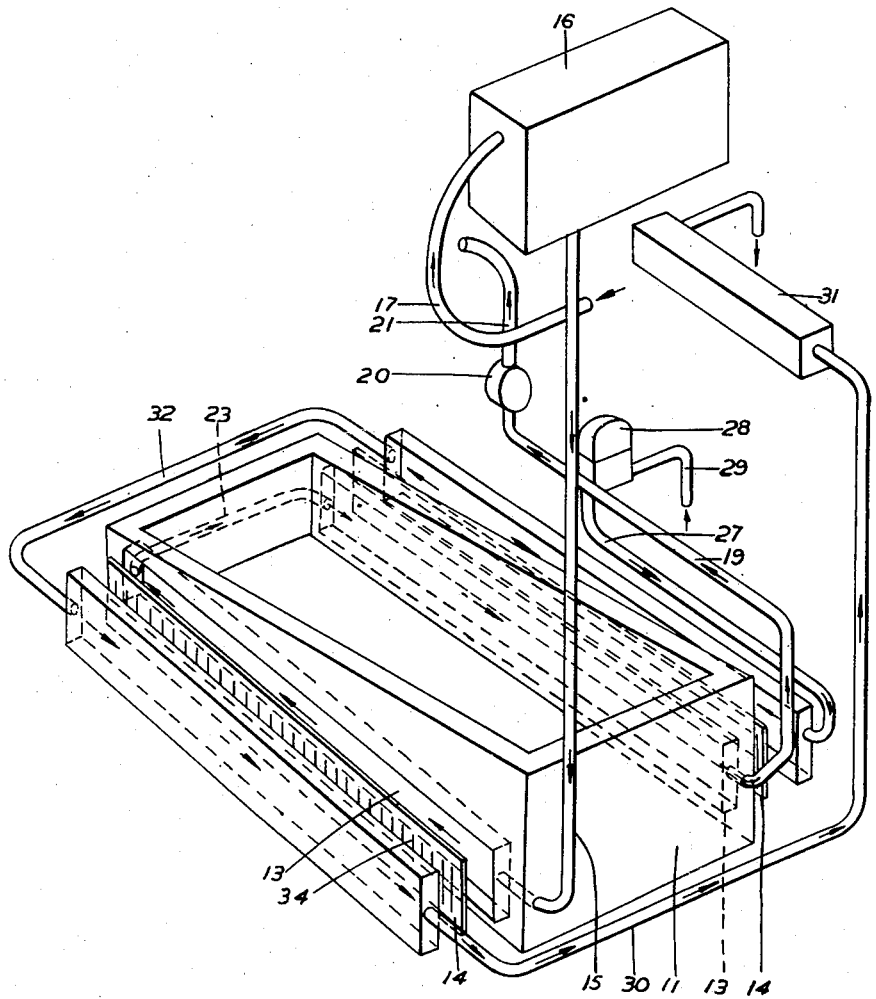

Figure 3 is a side elevation of the engine oil sump;

Figure 4 is a view looking at the front of the engine oil sump;

Figure 5 is a transverse sectional view of a modified construction for the engine oil sump; and Figure 6 is a diagrammatic view showing the water-cooling system.

Referring to the drawings, the preferred arrangement is illustrated in Figures 1 to 4 and shown diagrammatically in Figure 6. The modification illustrated in Figure 5 also incorporates the preferred arrangement on the side walls of the engine oil sump, and reference will be made thereto for details of the preferred arrangement. According to the preferred arrangement the system is associated with the two side walls of the engine oil sump. 10 indicates the engine and 11 is the oil sump, each side of which is provided with a pair of shallow chambers. Each side of the sump has continuous upstanding rib or flange 12 enclosing a shallow recess 13 on the outer face of the sump wall, see particularly Figure 3. A relatively thin wall or diaphragm 14 is fitted to the rib or flange 12 so that it covers the shallow recess 13 which thereby constitutes a narrow chamber at each side of the sump, see Figures 2 and 5. One end of one of the recesses or shallow chambers 13 is connected by a pipe 15 to a header tank 16 which latter is connected by a pipe 17 to the outlet 18 of the water-cooling system and the engine cylinder head, and a pressure relief valve 16' is connected to the header tank 16. The corresponding end of the other shallow chamber 13 on the other side of the sump is connected by a pipe 19 to the inlet side of a pump 20, the outer side of which is connected by a pipe 21 to the inlet 22 of the engine water jacket. The opposite ends of the two narrow chambers 13 are connected together by a passage 23 formed in the end wall of the sump. These two chambers 13 with their connecting passage and pipes together with the pump, engine, water jacket and header tank, comprise a closed-circuit water-cooling system. At each side of the sump 11 a cover 24 having a shallow recess in its inner face is fitted over the diaphragm 14 and is secured by screws 25 passing through the cover 24 and the diaphragm 14 into screw-threaded holes 26 in the rib or flange 12. In this way separate narrow chambers are provided outside the narrow chambers 13 of the closed-circuit at the side of the sump, the two chambers at each side being separated by the thin wall or diaphragm 14. One end of one of the outer chambers is connected by a pipe 27 to a separate supply of cooling liquid, in this example, being a marine engine, the supply can be obtained by means of a pump 28 and suction pipe 29 from the sea. The corresponding end of the other outer chamber is connected by a pipe 30 to a waste outlet, or, as indicated in Figures 2 and 6, to a water-cooled engine exhaust manifold 31, the opposite ends of the two outer chambers are connected together by a pipe 32. It will be seen, therefore, that the outer chambers and their connecting pipes and pump provide the second water cooling system in which the water is drawn from an exterior source by the pump 28 and passes through one outer chamber, through the connecting pipe 32, into the other outer chamber from which it is then discharged to a waste outlet or to the water cooled engine exhaust manifold 31.

As illustrated in this embodiment, the two pumps 20 and 28 can conveniently be mounted co-axially with the engine dynamo 33 from which the drive for the pumps can be taken through a coupling 46. As clearly shown in the diagrammatic view, Figure 6, cooling water is circulated through the closed circuit cooling system by the pump 20 and as the water, heated by the engine, passes through the inner narrow chambers 13 at the side of the sump, heat is transferred through the thin walls or diaphragm 14 to the water circulating through the outer chambers. The directions followed by the water in the two systems are indicated by the arrows in Figure 6. The thin walls or diaphragm 14 are preferably corrugated, the corrugations being arranged vertically as indicated at 34 in Figure 6. These diaphragms, however, may be formed in any other manner which will provide increased surface areas to facilitate rapid transference of heat between the liquids in the inner and outer chambers.

Referring now to the modification shown in Figure 5, provision may be made for cases in which the cooling provided by the narrow chambers on the sides of the sump is insufficient. For this purpose the bottom of the engine oil sump 11 may also be provided with one or more pairs of inner and outer shallow chambers constructed in a similar manner to those which are provided on the side walls of the sump as previously described. As illustrated in Figure 5 two continuous ribs or flanges 35, 36 are formed on the outer surface of the bottom of the sump, each rib or flange enclosing a shallow recess which, when fitted with thin walls or diaphragms 37, 38, constitute narrow chambers. Covers 39, 40 having shallow recesses are fitted over the diaphragms 37, 38 by means of screws 41 in a similar manner to the covers 24 on the side walls of the sump. In this way, two narrow chambers 42, 43 are provided on the bottom of the sump and are separated by the diaphragms 37, 38 from two outer narrow chambers 44, 45 in the covers 39, 40. The chambers 42, 43, and 44, 45 on the bottom of the sump may be connected in the same way as the side wall chambers with the closed circuit water cooling and the exterior supply of cooling liquid either independently or in series with the chambers on the side walls.

It will be understood that narrow water chambers as described above may be provided on the side walls of the engine oil sump, on the bottom of the sump, or on the side walls and bottom of the sump. The pump provided for circulating cooling liquid from an exterior source of supply through the outer chambers may, of course, be omitted, and the circulation effected in any other convenient manner.

Whilst it has been found convenient to provide the narrow chambers on the walls or bottom of the engine oil sump, such chambers may be associated with any other convenient part of the engine, preferably being located where additional cooling is desirable. It will be understood, that in any case a single pair of narrow chambers may be employed if desired.

I claim:

1. A water-cooling system of the closed-circuit type for an internal combustion or like engine, comprising a pair of chambers having intimate contact with one another and one of said chambers having intimate contact with a part of the said engine, means for connecting opposite ends of one of the pair of chambers to the closed-circuit cooling-system of the engine so that it is in series with and forms a part of the said closed circuit, means for supplying cooling liquid from an exterior source of supply to one end of the other chamber and means connected to the opposite end of said other chamber to discharge the cooling liquid therefrom.

2. A water-cooling system of the closed-circuit type for an internal combustion or like engine, comprising a pair of chambers separated from one another by a thin wall which forms a common wall for both said chambers whereby the latter have intimate contact with one another, one of said chambers having intimate contact with a part of the said engine, means for connecting opposite ends of one of the chambers to the closed-circuit cooling system of the engine so that it is in series with and forms a part of the said closed circuit, means for supplying cooling liquid from an exterior source of supply to one end of the other chamber and means connected to the opposite end of said other chamber to discharge cooling liquid therefrom.

3. A water-cooling system of the closed circuit type for an internal combustion or like engine, comprising a pair of chambers having intimate contact with one another, one of said chambers having intimate contact with a part of the said engine, opposite ends and said chamber being connected to the closed-circuit cooling-system of the engine so that it is in series with and forms a part of the said closed circuit, means for supplying cooling liquid from an exterior source of supply to one end of the other chamber and means connected to the opposite end of said other chamber to discharge the cooling liquid therefrom.

4. A water-cooling system of the closed-circuit type for an internal combustion or like engine, comprising a pair of chambers having intimate contact with one another and one of said chambers having intimate contact with the engine oil-sump, means for connecting opposite ends of one of the chambers to the closed-circuit cooling-system of the engine so that it is in series with and forms a part of the said closed circuit, means for supplying cooling liquid from an exterior source of supply to one end of the other chamber and means connected to the opposite end of said other chamber to discharge the cooling liquid therefrom.

5. A water-cooling system of the closed-circuit type for an internal combustion or like engine, comprising a pair of chambers separated from one another by a thin wall which forms a common wall for both said chambers whereby the latter have intimate contact with one another one of said chambers having intimate contact with the engine oil sump, means for connecting opposite ends of one of the chambers to the closed-circuit cooling system of the engine so that it is in series with and forms a part of the said closed circuit, means for supplying cooling liquid from an exterior source of supply to one end of the other chamber and means connected to the opposite end of said other chamber to discharge the cooling liquid therefrom.

6. A water-cooling system of the closed-circuit type for an internal combustion or like engine, comprising a plurality of pairs of chambers, the chambers of each pair having intimate contact with one another and one of each pair of chambers having intimate contact with a part of the said engine, means for connectng opposite ends of one chamber of each pair of chambers to the closed-circuit cooling-system of the engine so that they are in series with and form a part of the said closed circuit, means for connecting in series the other chambers of said pairs of chambers, means for supplying cooling liquid from an exterior source of supply to one end of said series of other chambers and means connected to the opposite end of each of said other chambers to discharge the cooling liquid therefrom.

7. A water-cooling system of the closed-circuit type for an internal combustion or like engine, having a pair of chambers one of which is defined by a continuous upstanding flange on the outer surface of the engine oil sump and a thin wall is fitted to the flange to enclose the said chamber, the other chamber is provided by a shallow recess in a cover adapted to be fitted over the thin wall whereby the said thin wall serves as a common wall between the pair of chambers, means are provided for connecting opposite ends of the first mentioned chamber to the closed-circuit cooling system of the engine so that it is in series with and forms part of the said closed circuit, means are provided for supplying cooling liquid to one end of the other chamber, and means are connected to the opposite end of said other chamber to discharge the cooling liquid therefrom.

LAWRENCE HATHAWAY.

REFERENCES CITED

The following references are of record in the file of this patent:

UNITED STATES PATENTS

| Number | Name | Date |
| --- | --- | --- |
| 1,291,502 | Hawley | Jan. 14, 1919 |
| 1,747,172 | Huber | Feb. 18, 1930 |
| 1,875,580 | Fisher | Sept. 6, 1932 |